(12) United States Patent
Hou et al.

(10) Patent No.: US 9,325,686 B2
(45) Date of Patent: Apr. 26, 2016

(54) SYSTEM AND METHOD OF GENERATING VERIFICATION CODE

(71) Applicant: Alibaba Group Holding Limited, Grand Cayman (KY)

(72) Inventors: Xinjie Hou, Hangzhou (CN); Xuefei Zhang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 110 days.

(21) Appl. No.: 14/052,491

(22) Filed: Oct. 11, 2013

(65) Prior Publication Data

US 2014/0109207 A1    Apr. 17, 2014

(30) Foreign Application Priority Data

Oct. 12, 2012    (CN) .......................... 2012 1 0387390

(51) Int. Cl.
*H04L 29/06*    (2006.01)
*G06F 21/31*    (2013.01)

(52) U.S. Cl.
CPC ............... *H04L 63/08* (2013.01); *G06F 21/31* (2013.01); *G06F 2221/2133* (2013.01)

(58) Field of Classification Search
CPC .. H04L 63/08; G06F 21/31; G06F 2221/2133
See application file for complete search history.

(56) References Cited

U.S. PATENT DOCUMENTS

| 7,941,834 | B2 | 5/2011 | Beck et al. |
| 8,433,285 | B2 | 4/2013 | Cao |
| 2004/0230843 | A1 | 11/2004 | Jansen |
| 2005/0117886 | A1* | 6/2005 | Kang et al. ........... 386/95 |
| 2005/0140675 | A1 | 6/2005 | Billingsley et al. |

(Continued)

FOREIGN PATENT DOCUMENTS

| EP | 2043021 | 4/2009 |
| GB | 2429094 | 2/2007 |

OTHER PUBLICATIONS

Captcha Creator Professional PHP Captcha Script, "Unknown author", Jan. 1, 2012, pp. 1-4, http://www.captchacreator.com/v-customize.html.*

(Continued)

*Primary Examiner* — Hadi Armouche
*Assistant Examiner* — Cheng-Feng Huang
(74) *Attorney, Agent, or Firm* — Lee & Hayes, PLLC (57) ABSTRACT

The present disclosure provides techniques for generating an authentication code. These techniques may modularize processing diagram, noise element and words content as several modules. Then, a context message is added in individual modules by a computing device. The computing device may generate a plurality of contexts based on a configuration rendering style. Individual contexts correspond to one kind of diagram style allocation of authentication code. The computing device may define an executing sequence of the context based on a predetermined algorithm rule, and execute the drawing of diagram authentication code of the context based on the executing sequence of the sharp context.

13 Claims, 5 Drawing Sheets

(56) References Cited

U.S. PATENT DOCUMENTS

| | | |
|---|---|---|
| 2005/0198580 A1 | 9/2005 | Hua et al. |
| 2008/0106371 A1 | 5/2008 | Tseng et al. |
| 2010/0180336 A1 | 7/2010 | Jones et al. |
| 2010/0302255 A1 | 12/2010 | Brown et al. |
| 2011/0016520 A1* | 1/2011 | Cohen et al. .................. 726/19 |
| 2011/0259962 A1 | 10/2011 | Picard et al. |
| 2012/0005483 A1 | 1/2012 | Patvarczki et al. |
| 2012/0180115 A1 | 7/2012 | Maitland |
| 2012/0323700 A1* | 12/2012 | Aleksandrovich et al. .................. 705/14.69 |
| 2013/0112760 A1 | 5/2013 | Schory et al. |

OTHER PUBLICATIONS

Onwudebelu et al., "CAPTCHA Malaise: Users suffer Consequences of the Antispam Technology while the Spammers Adapt", Proceedings of the International Conference on Software Engineering and Intelligent Systems, Jul. 5-9, 2010, Ota, Nigeria, pp. 113-126.*

Captcha Creator Professional PHP Captcha Script, "Unknown author", Jan. 1 2012, pp. 1-4, http://www.captchacreator.com/v-customize.html.*

PCT Search Report and Written Opinion mailed Jan. 3, 2014 for PCT application No. PCT/US13/64668, 10 pages.

* cited by examiner

FIG. 1

Generating plural contexts based on an configuration information of a rendering style, each context corresponding to one kind of diagram style configuration of authentication code, wherein the configuration information of rendering style is configured by a user or is pre-configured by a networking server 202

Defining an executing sequence of the context based on a predetermined algorithm rule, and executing the drawing of diagram authentication code of the context based on the executing sequence of the context 204

SYSTEM AND METHOD OF GENERATING VERIFICATION CODE

CROSS REFERENCE TO RELATED PATENT APPLICATIONS

This application claims priority to Chinese Patent Application No. 201210387390.3, filed on Oct. 12, 2012, entitled "System and Method of Generating Verification Code," which is hereby incorporated by reference in its entirety.

TECHNICAL FIELD

The present disclosure relates to a networking field, and more particularly to generating authentication code for network security.

BACKGROUND

With the popularity of computers and the advance of networking technology, the Internet touches every corner of our daily life. The development of the Internet not only brings us a convenience, but also brings us a variety of challenges as well. Some malicious users may use robot programs to massively occupy Internet resources, such as sending spam mail or a massive attack. To avoid such malicious behaviors, a server is usually configured to have a program tool that can automatically identify a user as a malicious user or a goodwill user to reduce a risk of malicious attack on the server.

A diagram authentication code is a program tool that is used for indentifying an Internet user as a goodwill user or a malicious user. The diagram authentication code is a diagram including words by which a user is requested to answer. Once a user can correctly answer, he/she will be regarded as a goodwill user and will be allowed to proceed to the next operations.

Regarding the conventional authentication code generating system, it generally pre-generates an authentication library including enormous authentication code diagrams. For every submission of authentication request, the system will pick up one authentication code diagram from the authentication library. However, there is only one diagram displaying mode for displaying the conventional authentication code by which it only displays words and a single-color background. Recently, related anti-crack mechanisms have been added, such as adding of background or adding of noise lines. However, some mechanisms may cause bad user experience because, for example, they add too many improper noise lines.

In addition, the form of the conventional authentication code is non-adjustable or the adjustment is not flexible. Accordingly, the form cannot be effectively adjusted timely during a malicious attack. With the increment of on-lining operations, the conventional authentication code is relatively easily cracked. This causes risks and defects for network security.

SUMMARY

The present disclosure provides methods and systems for generating an authentication code to improve network security. In some embodiments, the authentication code may include a diagram, a noise element, and words content, a context message that are associated with individual modules.

Embodiments of the present disclosure related to a system for generating an authentication code generating to improve network security. The system may include a context generating module, a random word generating module, a background generating module, a font registering module, a letter paint module, a logo paint module and a noise paint module.

In some embodiments, the context generating module generates a plurality of contexts corresponding to each module based on a configuration file of a rendering style. The random word generating module randomly generates a word from a word library based on a corresponding context, wherein the word library may include at least one of an English letter, an Arabic number, and a symbol. The background generating module generates a background diagram based on a corresponding context, and assigns a size of background diagram based on the configuration file of a rendering style. The font registering module defines a font of the word based on a corresponding context. The letter paint module draws the word using its font based on a corresponding context. The logo paint module chooses a logo based on the configuration file of rendering style, and draws the logo based on a corresponding context. The noise paint module chooses a noise based on the configuration file of a rendering style, and draws the noise based on a corresponding context.

The embodiments of the present disclosure also relate to a method for generating an authentication code to enhance the difficulty of cracking the authentication code and to improve the network security. The method may include generating, by a computing device, a plurality of contexts based on configuration information of rendering styles. Each context is corresponding to one kind of diagram style configuration of authentication code. The configuration information of a rendering style is configured by a user or is pre-configured by a networking server. The computing device may also define an executing sequence of the context based on a predetermined algorithm rule, and execute the drawing of diagram authentication code of a context based on the executing sequence of the context.

The embodiments of the present disclosure also relate to a method for generating an authentication code that executes a reprocess in relation to an existing authentication code to enhance difficulty in cracking the authentication code. The method may include retrieving, by a computing device, a diagram authentication code and configuration information of a rendering style. The configuration information of a rendering style is configured by a user or is pre-configured by a networking server. The computing device generates an original context based on the diagram authentication code, and analyzes the original context based on the configuration information of the rendering style to generate the required context. Then, the computing device may redraw a new diagram authentication code based on the context and the original context.

As compared with the conventional technology, the present disclosure has advantages. For example, the rendering process for authentication code is more flexible, and is variable by employing different rendering strategies based on different environments. The authentication code can be generated by dynamically combining the modules and the executing sequence thereof based on different demands to enhance the ability of preventing malicious behaviors. Because all modules are adjustable with different strategies in accordance with the corresponding context from which the strategy is selected based on a user's experience, a user experiences a more comfortable authentication code rendering process. In rendering process, strategies can not only be configured by a user, but also be automatically selected based on the context of diagram information in the current phase. This supports a creation of rendering and a reuse of rendering with respect to the existing diagram. Certainly, it is not necessary for a product of the present disclosure possessing all benefits as mentioned above at the same time.

This Summary is not intended to identify all key features or essential features of the claimed subject matter, nor is it intended to be used alone as an aid in determining the scope of the claimed subject matter.

BRIEF DESCRIPTION OF THE DRAWINGS

The accompanying drawings described herein are used as a part of the present disclosure for better understanding the technical solutions of the present disclosure. The embodiments of the present disclosure in the following description are used for describing the embodiments more clearly but not for limiting the present disclosure.

DETAILED DESCRIPTION

The implementation of the present disclosure will be fully described in the following description by the accompanying embodiments and the drawings of the present disclosure. In view of the present disclosure, one of ordinary skill can thus fully understand the implementing processes with regard to how the technical solution of the present disclosure is applied for solving the prior technical problem and for achieving the technical efficiency.

An embodiment of the present disclosure provides a solution of componentizing a diagram, a noise element and the words content of an authentication code generating system as several modules, and further adding a context message in each module to solve the problem that the conventional authentication code diagram is easy to be cracked.

Figure 1:
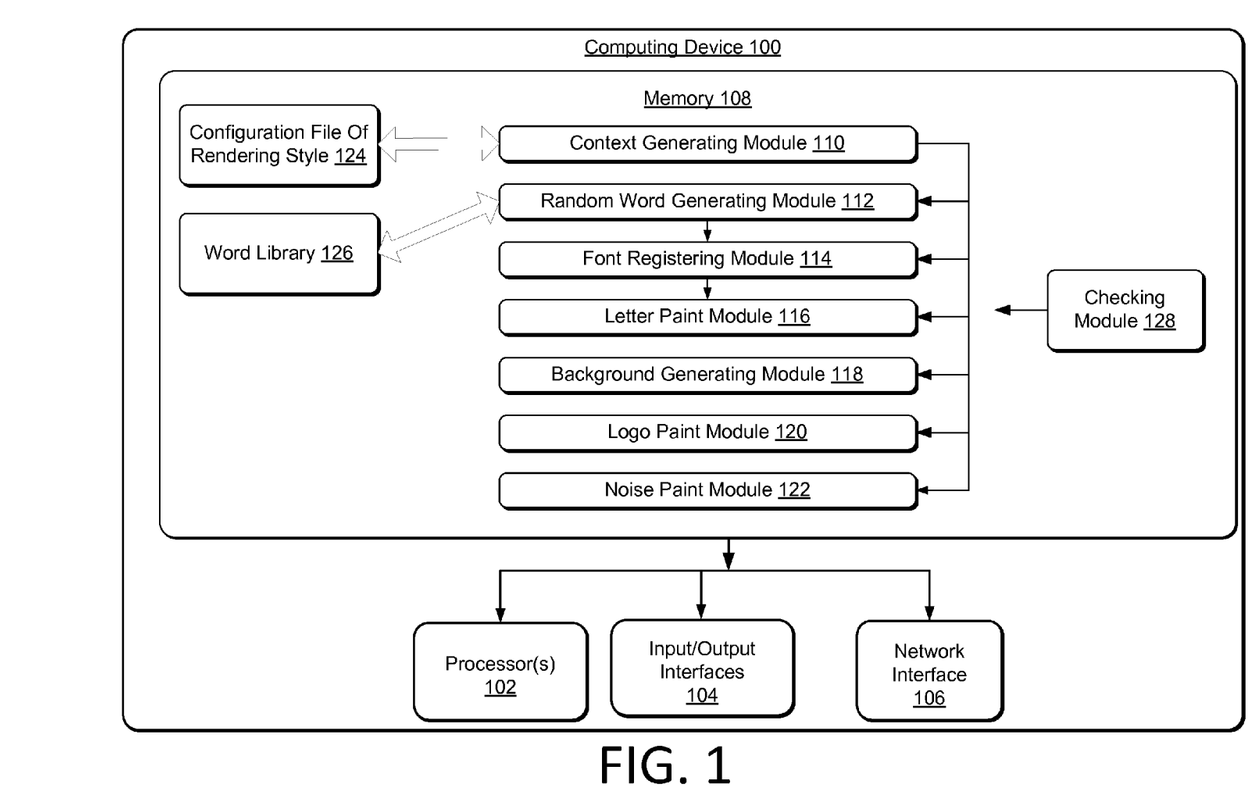
FIG. 1 is a schematic diagram illustrating an authentication code generating system.

FIG. 1 is a schematic diagram illustrating an authentication code generating system. The computing device 100 may be a user device or a server for generating an authentication code. In one exemplary configuration, the computing device 100 includes one or more processors 102, input/output interfaces 104, network interface 106, and memory 108.

The memory 108 may include computer-readable media in the form of volatile memory, such as random-access memory (RAM) and/or non-volatile memory, such as read only memory (ROM) or flash RAM. The memory 108 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 108 in more detail, the memory 108 may include a context generating module 110, a random word generating module 112, a font registering module 114, a letter paint module 116, a background generating module 118, a logo paint module 120, a noise paint module 122, and a checking module 128.

The context generating module 110 generates a plurality of contexts corresponding to a module of the system 100 based on a configuration file of rendering style 124. The configuration file of rendering style 124 includes configuration information of rendering style. The configuration information of rendering style may include a parameter, a time, a step and a status for executing each module. The configuration information of rendering style may be either configured by a user through a user interface or pre-configured by the system 100.

When the context generating module 110 generates a plurality of context contexts corresponding to each module, the module required for drawing diagram authentication code is determined based on the configuration information of rendering style, wherein the term "context" used here is defined as a corresponding context corresponding to the each module, which will not be extra explained hereinafter.

The random word generating module 112 randomly generates a word from a word library 126 based on a corresponding context, in which the word library 126 includes at least one of one English letter, one Arabic number, and one symbol. In particular, the English letter may be the combination of 52 upper and lower cases of A, B, C, . . . , x, y, z, and be combined with the Arabic numbers 0-9.

The background generating module 118 generates a background diagram based on a corresponding context, and assigns a size of background diagram based on the configuration file of rendering style. If the size of background diagram is not assigned, then a defaulted size pre-configured by the generating system will be assigned as the size of background diagram.

The font registering module 114 defines a font of the word based on a corresponding context. If there is not a defined font, a defaulted font pre-configured by the system 100 will be used.

The letter paint module 116 draws a letter with the font defined by the font registering module 114 on the background diagram based on a corresponding context as mentioned above. The letter paint module 116 is performed by a letter deformation during the drawing. The letter deformation may include a rigidity change such as rotating or translating, and/or non-linear change such as scaling or skewing. The letter deformation may result in different effects of the authentication code with respect to different fonts. Similarly, one font that applies different letter deformations may also result in different effects of the authentication code. The different effects may be determined by the context generating module 110 depending on the configuration information of rendering style and a corresponding context.

The logo paint module 120 chooses a logo based on the configuration file of rendering style 124 to thus draw the logo on the background diagram based on a corresponding context. The rendering in relation to the logo drawing will increase difficulty of reading for robot programs. However, the rendering would not confuse a goodwill user but will increase the identification service that is provided.

The noise paint module 122 chooses a noise based on the configuration file of rendering style 124 to thus draw the noise on the background diagram based on a corresponding context. The noise includes partial noise such as a snowflake, a texture noise such as a water ripple, a breaking process or a curve line noise such as a Bezier curve, etc.

The checking module 128 checks the accomplished diagram authentication code based on a checking rule. The checking module 128 may restart a configuration of the context for the corresponding module based on a checking result to generating a new diagram authentication code. The principle of checking rule ensures that the authentication code is readable by human eyes rather than robot programs. In some embodiments, the system 100 of the present disclosure may be implemented to modularize drawing processes of the diagram authentication code; so if the drawn diagram authentication code does not match with the checking rule, the corresponding module can be called to modify the diagram authentication code. Accordingly, the drawing of the diagram authentication code is more user-friendly and is more diverse.

For example, if the drawn letter is found by the checking module 128 that the length of background is smaller than the size of letter generated by the letter paint module 116, the checking module 128 will call the context generating module 110 to restart to configure a corresponding context of letter paint module 116 or configure the background generating module 118 to match the size of background with the letter.

In another example, if the checking module 128 finds that the size of the noise is smaller than the size of the letter generated by the letter paint module 116, it is determined that the letter cannot be covered by the noise and the generated authentication code may be readable by a robot program. Accordingly, the checking module 128 will call the context generating module 110 to reconfigure a corresponding context of letter paint module 116, and/or a corresponding context of the noise paint module 122 to match the size of noise with that of the letter.

For another example, when the font registering module 114 is used for registering a specific font, the letter drawn by the letter paint module 116 may be hardly recognized by human eyes, or may be easy to be mistakenly recognized. Therefore, the combination of these kinds of fonts and letters should be avoided using a predetermined configuration that excludes this combination in checking rule. When the checking module 128 finds this kind of combination of the font and letter, the checking module 128 will call the context generating module 110 to reconfigure a corresponding context of the font registering module 114 or a corresponding context of the letter paint module 116 to change the letter and/or the font for preventing the combination.

For another example, when the background diagram is generated by the background generating module 118, a color or design of the letter generated by the letter paint module 116 and a background diagram may result in a difficult reorganization by human eyes or a wrong reorganization, or may cause a confusion for human eyes. The combination of the background diagram and the letter with respect to the color and design should be avoided using a predetermined configuration that excludes this combination in a checking rule. If the combination of the background diagram and the letter with respect to color and design is found, the checking module 128 will call the context generating module 110 to reconfigure a corresponding context of the background generating module 118 or a corresponding context of the letter paint module 116 by changing the letter and/or the background diagram to prevent the occurrence of the combination.

It should be noted that the configuration information of a rendering style includes parameters, time, steps, and statuses for executing each module. As a result, when the diagram authentication code is drawn, each module in the generating system can be processed by an infinite iteration of a single step, a combination of branches, or a parallel merge. In these instances, the corresponding steps can be adjusted and selected to bring good effect for the expansibility of the system, and the new module can be added in the subsequent extension.

In the rendering process, each module is stored with a corresponding context corresponding to the parameter of the module, and the parameter and the operation of the current step will be determined based on a corresponding context message of the previous step. The context provides a description and a position characteristic description with better robustness, and each module draws a rendering effect on the diagram authentication code based on the context message of the previous step. This prevents confusing diagram rendering effects and provides a human-friendly authentication code while still keeping the strength of the complexity for the diagram authentication code. The conventional rendering method employs the scheme of randomly selecting the rendering effect, and therefore may generate an authentication code that is difficult for a human user to recognize.

In sum, the present disclosure provides an authentication code generating system by modularizing the combined diagram authentication code generation as several modules in a manner that a context is added in each module by dynamically combining the modules and the executing sequence thereof based on different demands. Furthermore, because these modules are adjustable with respect to different strategies in accordance with the corresponding context, in which the strategy is selected based on a user's experience. Therefore, a user experiences a more comfortable authentication code rendering provided by the system 100.

Figure 2:
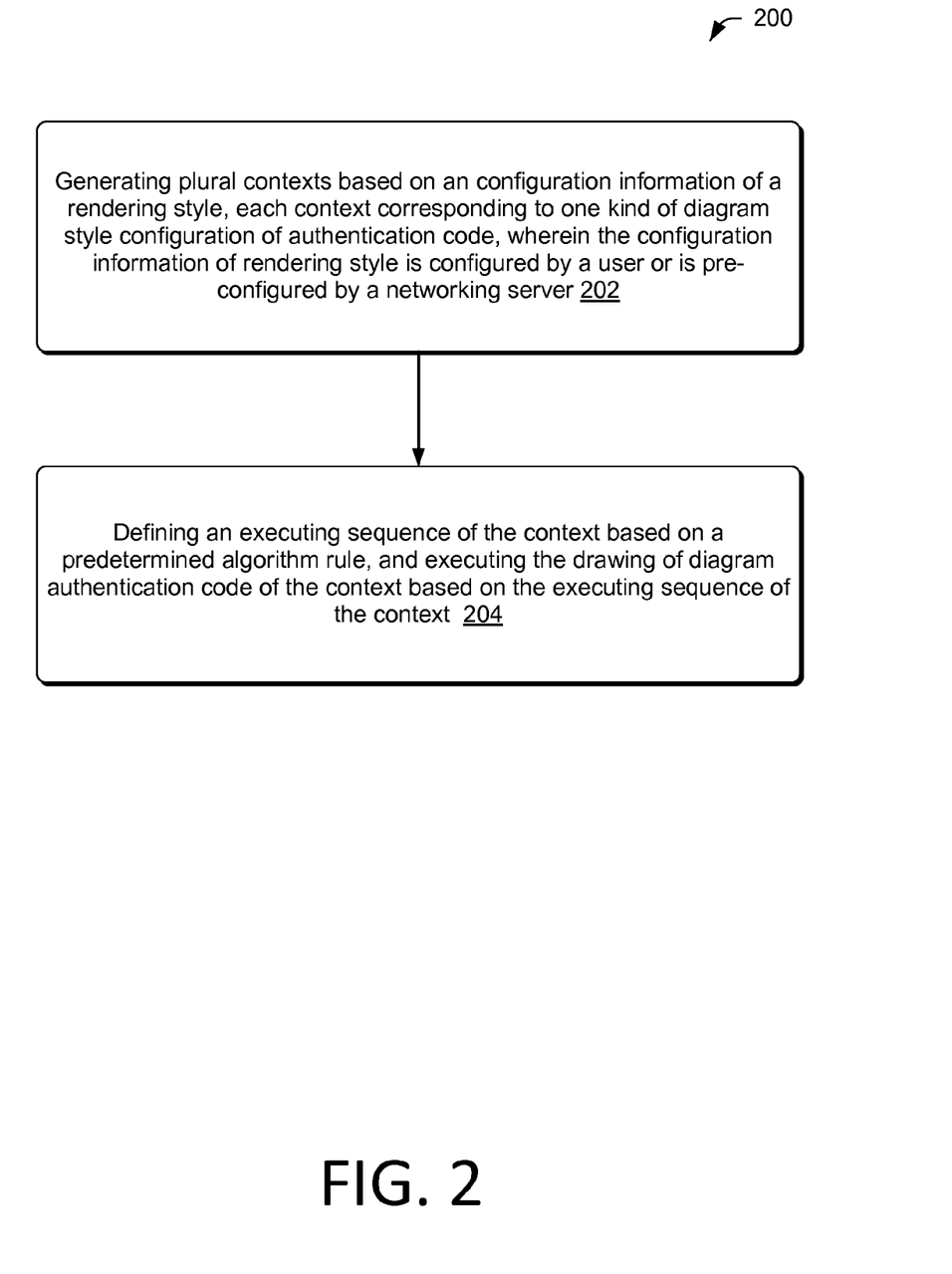
FIG. 2 is a flowchart illustrating a process for generating an authentication code.

The present disclosure also relates to a method for generating an authentication code to improve network security. The method may be applied to an authentication code generating system associated with a networking server. FIG. 2 is a flowchart illustrating a process for generating an authentication code. At 202, a computing device may generate a plurality of contexts based on configuration information of a rendering style, each context corresponding to one kind of diagram style configuration of authentication code. In some embodiments, the configuration information of a rendering style may be configured by a user or is pre-configured by a networking server.

At 204, the computing device may define an executing sequence of the context based on a predetermined algorithm rule, and execute the drawing of diagram authentication code of the context based on the executing sequence of the context.

The configuration information of a rendering style comprises reference information required as parameters, time, procedures and statuses for generating the plurality contexts at 202. The configuration information of a rendering style may be either personally configured by a user through a user interface or pre-configured by the computing device. The method may be executed in combination of hardware and software by means of a program of Java and JavaScript languages.

Figure 3:
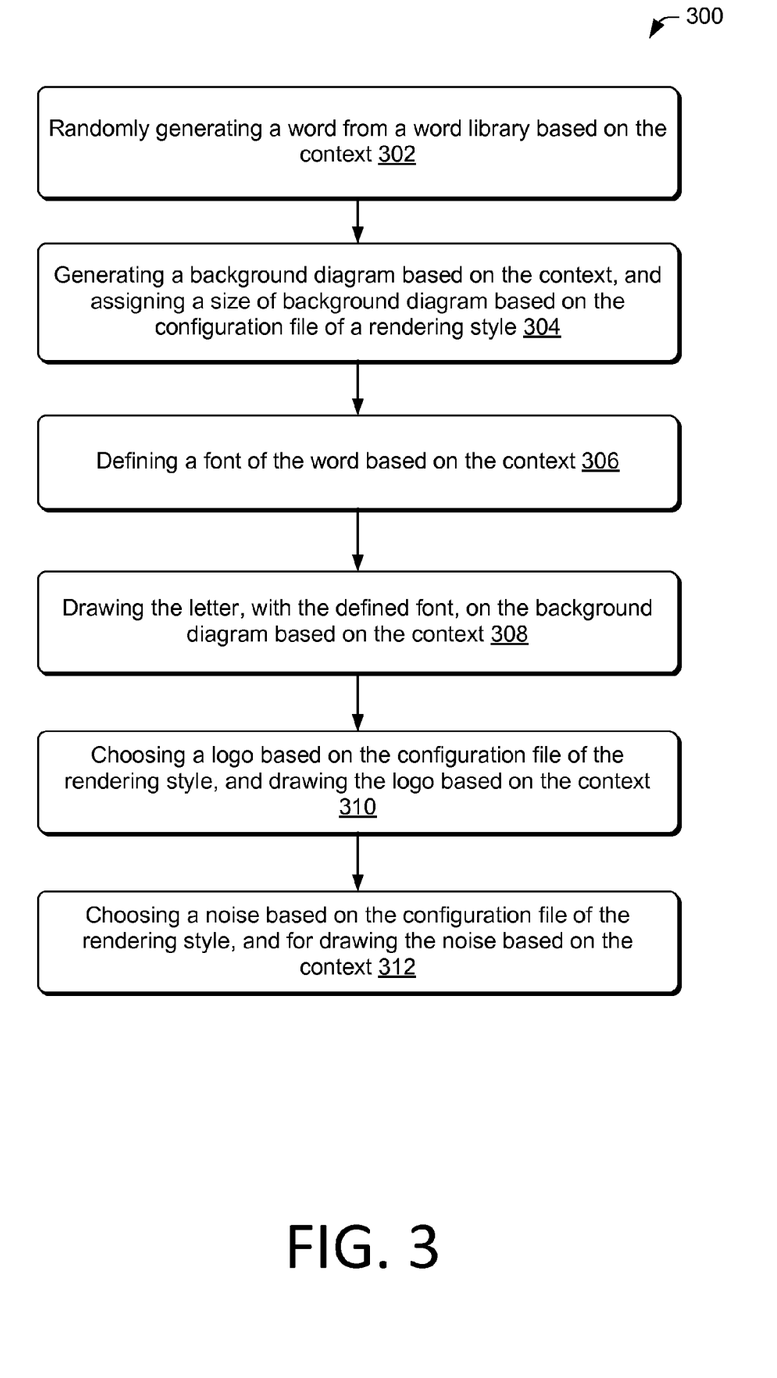
FIG. 3 is a flowchart illustrating another process associated with the process of FIG. 2.

FIG. 3 is a flowchart illustrating another process associated with the process of FIG. 2. At 302, the computing device may randomly generate a word from a word library based on the context. The word library may include at least one of an English letter, an Arabic number, or a symbol.

At 304, the computing device may generate a background diagram based on the context, and assign a size of background diagram based on the configuration file of a rendering style. At 306, the computing device may define a font of the word based on the context. At 308, the computing device may draw the letter, with the defined font, on the background diagram based on the context. At 310, the computing device may choose a logo based on the configuration file of the rendering style, and draw the logo based on the context. At 312, the computing device may then choose a noise based on the configuration file of the rendering style, and draw the noise based on the context.

It should be noted that the executing sequence of the context is firstly generating a word (the step 302), then generating a background diagram (the step 304), and then determining a form of the word that is displayed in a diagram authentication code (the step 306 and the step 308), and finally generating the logo (the step 310) and the noise (the step 312). Persons with ordinary skill in the art should understand that the steps from 302 to the 312 of the embodiments are capable of being executed in a different sequence or by deleting or omitting one step based on configuration information of rendering style.

Figure 4:
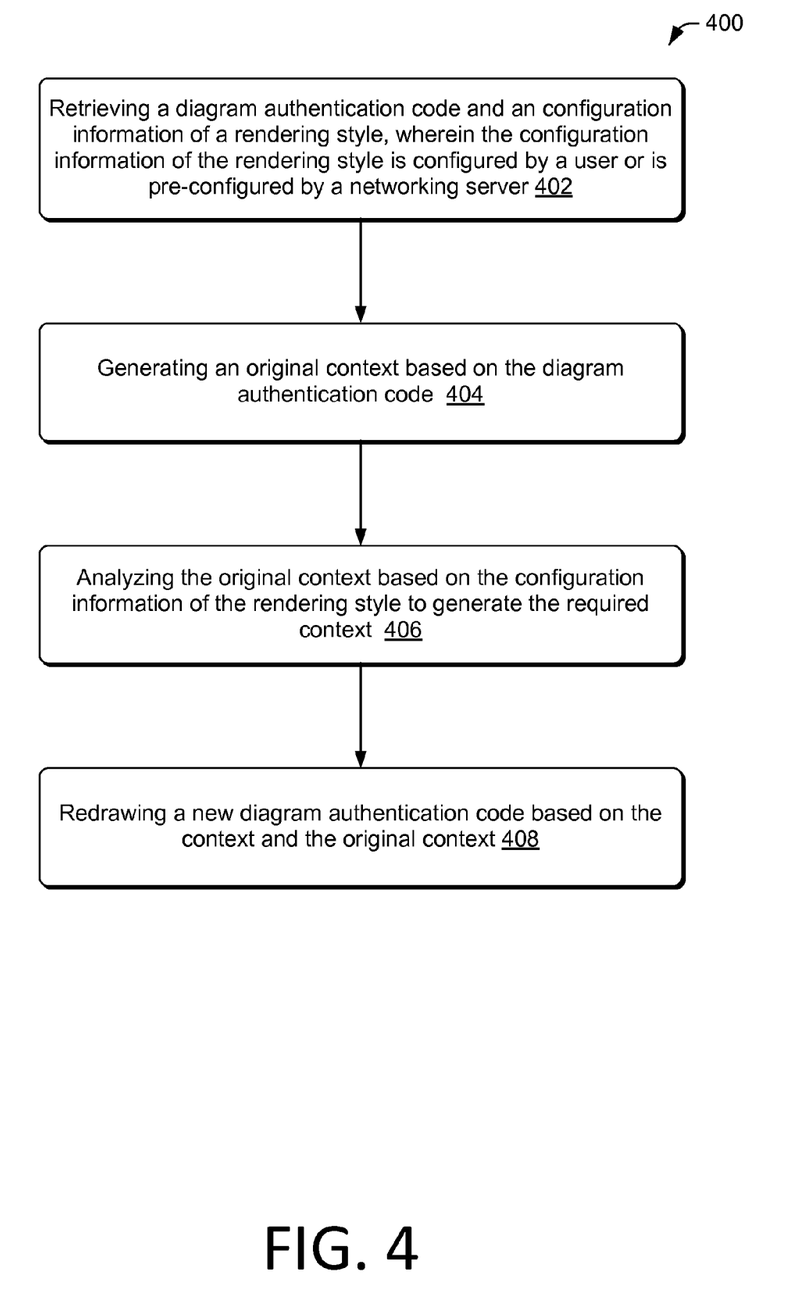
FIG. 4 is a flowchart illustrating a process for generating an authentication code.

The embodiments of the present disclosure also relate to a method for generating an authentication code that executes a reprocess in relation to an existing diagram authentication code to enhance the difficulty of cracking the diagram authentication code. FIG. 4 is a flowchart illustrating a process for generating an authentication code. At 402, a computing device may retrieve a diagram authentication code and configuration information of a rendering style wherein the allocation information of the rendering style is configured by a user or is pre-configured by a networking user. At 404, the computing device may generate an original context based on the diagram authentication code. At 406, the computing device may analyze the original context based on the configuration information of the rendering style to generate the required context. At 408, the computing device may draw a new diagram authentication code based on the required context and the original context.

In some embodiments, when a server finds that a user fails to response to authentication for a predetermined number of times, the server will determine that the user is a malicious user. The server will recall the diagram authentication code that has been generated, analyze the original context based on the recalled diagram authentication code, and execute a process, such as adding a new kind of noise in relation to the recalled diagram authentication code. The added noise will disturb the judgment of a robot program to enhance the difficulty of cracking the diagram authentication code.

Figure 5:
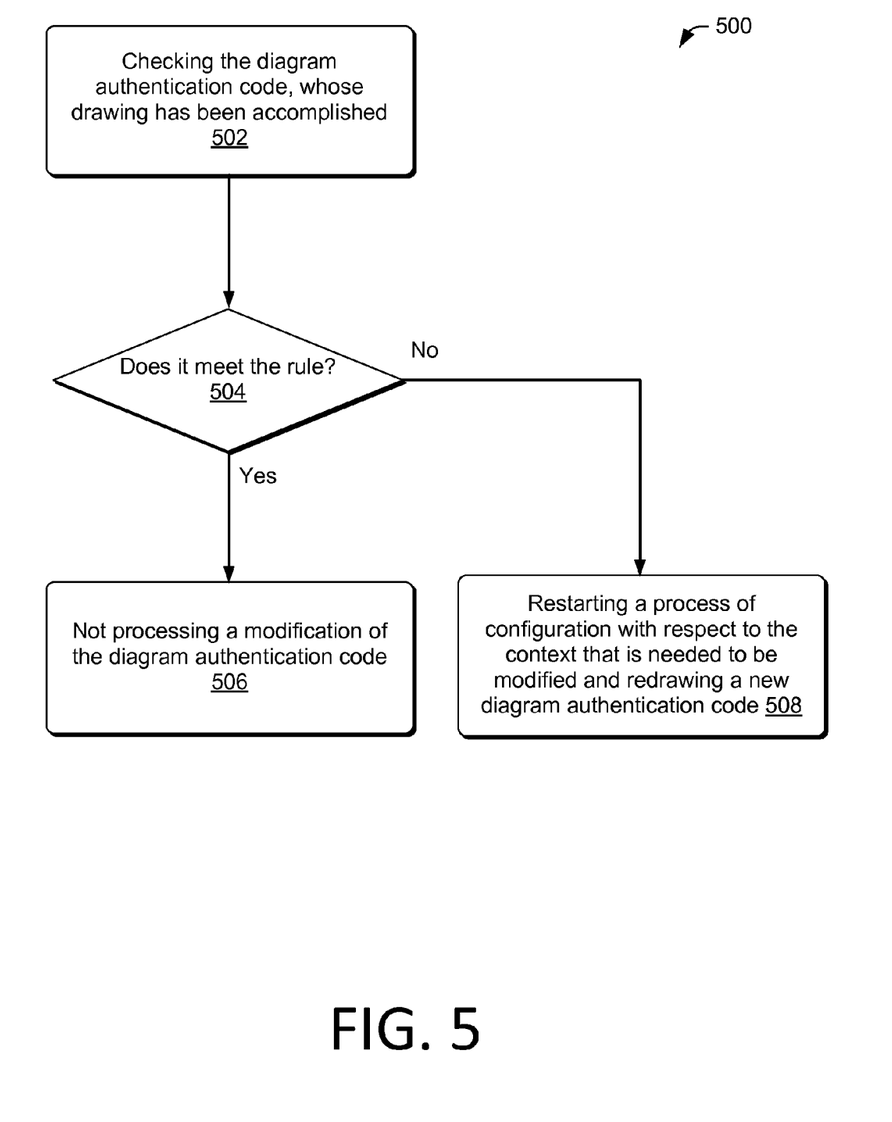
FIG. 5 is a flowchart illustrating a process for generating an authentication code.

Furthermore, to enable the diagram authentication code to be more user friendly and let the drawn diagram authentication code be more diverse as well, the present disclosure further provides a method for generating an authentication code to ensure that the authentication code is readable by human eyes rather than the robot program. The method may execute a process of checking the accomplished diagram authentication code. FIG. 5 is a flowchart illustrating a process for generating an authentication code. At 502, a computing device may check the diagram authentication code. At 504, the computing device may determine whether the diagram authentication code meets the predefined rule. At 506, the computing device may not process a modification of the diagram authentication code if it is found to meet the checking rule. At 508, the computing device may restart a process of configuration with respect to the context that is needed to be modified and redraw a new diagram authentication code if it fails to meet the checking rule.

In some embodiments, the computing device may reconfigure the context to enable the background to match with the letter in size if the background is too small to include the drawn letter. Moreover, after the letter is drawn, if the size of the noise is found to be smaller than the size of the letter, then some elements of the context is reconfigured for redrawing the authentication code in a way that the noise and the letter matches in size. Further, in response to a determination that a user may not be able to recognize a letter drawn in a certain font, the context may be reconfigured by change at least one of the letter or the certain font such that the combination of the letter and the certain font will be avoid.

Furthermore, it may be found that a specific background drawn with letters having similar colors or designs may be difficult to recognize by human eyes or may cause a mistaken recognition, or that the combination of the colors and design may cause a mistaken recognition by human eyes in spite of the colors and patterns not being similar to each other. In these instances, the method of the present disclosure will pre-configure a collection of a improper combination of the background diagram and the letter with respect to colours and designs. If the improper combination of the background diagram and the letter with respect to color and design is found, the context will be reconfigured to prevent the occurrence of this kind of combination.

In some embodiments, a mechanism of the context based on two examples of the present disclosure is described as following exemplary algorithm 1.

---
Algorithm 1
---

```
public Captcha paint(String calledKey, Captcha root)
        throws ClassNotFoundException, InstantiationException,
IllegalAccessException, PaintException {
    String cls = (String) root.getConf( ).get(calledKey, String.class);
String caller = sun.reflect.Reflection.getcallerClass(2).getName( );
If (cls !=null &&!"".equals(cls)){
    Class clazz= Class.forName(cls);
    ImageInterface image = (ImageInterface) clazz.newInstance( );
    Captcha sub = image
.paint (ContextMachine.createContext(root,clazz));
        ContextMachine.reduceContext(root, sub, caller);
root.setImage(sub.getImage( ));
    }
    return root;
}
public Captcha paint (Object callingObject, Captcha root)
        throws PaintException {
ImageInterface image = (ImageInterface) callingObject;
Captcha sub = image.paint(root);
return sub;
}
```

The main program, called "root", generates a context, called "sub", by ContextMachine.createContext function, and assigns a rendering module to draw, called "paint", by context (sub). After the paint is finished, data information that is executed by the current module is obtained, and is stored in the context, called "sub", and then the context, i.e., the sub, is returned to the main program, called "the root", by ContextMachine.reduceContext function to combine an executed data sum of the current module. The following code is an example of drawing a noise line (algorithm 2).

---
Algorithm 2
---

```
public Captcha paint(Captcha input) throws PaintException {
    BufferedImage bi = input.getImage( );
int width = bi.getWidth( );
int height = bi.getHeight( );
Graphics g = bi.getGraphics( );
int lineCount = (Integer) input.getConf( ).get("linecount",
        Integer.class);
```

-continued

Algorithm 2

```
int lineWidthRandom = (Integer) input.getConf( ).get("linewidthrandom",
        Integer.class);
Color color = new ColorUtil( ).getColor(input);
g.setColor(color);
CaptchaLog log = new CaptchaLog(input);
log.log("noisecolor", Integer.toHexString(color.getRGB( )));
log.log("noisecolor:red", color.getRed( ));
log.log("noisecolor:green", color.getGreen( ));
log.log("noisecolor:blue", color.getBlue( ));
for(int i = 0; i<lineCount; i++ ){
    int x = RandomUtil.getInstance( ).nextInt(width);
    int y = RandomUtil.getInstance( ).nextInt(height);
    int xl = RandomUtil.getInstance( ).nextInt(lineWidthRandom);
    int yl = RandomUtil.getInstance( ).nextInt(lineWidthRandom);
    g.drawLine(x, y, x+xl, y+yl);
}
return input;
```

As illustrated in algorithm 2, a width that is called "width", a height that is called "height" and a back diagram that is called "g" of an inputted diagram which is stored after the previous operation is accomplished. In some embodiments, the computing device may obtain a number (linecount) and a thickness (linewidthrandom) of noise lines, and outputting the context to a color module, and then obtain a color item which is configured and stored by the color module. Then, the computing device may draw the noise line (g.drawline) on the background diagram based on the number, the thickness and the colors of noise lines. After rendering, the computing device may return the background diagram drawn with the noise line to the context input for the storage.

It should be noted that the difference information is also recorded in the context to facilitate the determination of rendering for the sequential rendering. Even the same module is used, and there are some factors that may cause different rendering results, such as random values in which some random values will cause a bad diagram effect, for example, an unclear diagram or a diagram that is easy to crack. Based on the effect of the recorded values for the corresponding diagrams, it thus allows elements to be optimized by means of statistical analysis. This is an upgrading iterative process, and the values corresponding to the diagrams are difference information.

By means of the above examples, the context has two functions. In some embodiments, the rendering module is adjusted based on strategies based on the context to ensure that a combination and a sequence of the modules are dynamically adjustable; secondly, the context can record and store the data result of the rendering operation which is accomplished in the current step, and after the current rendering step is accomplished, the context can directly output the data result of the current step to the next step while the next rendering is called by the context.

The present disclosure may be applied in one or more computer readable storage mediums including a computer accessible program code, such as a hard disk storage medium, a CD-ROM, and an optical storage medium.

The above description illustrates preferred embodiments of the present disclosure, but as previously mentioned, it should be understood the above embodiments are not for limiting the present disclosure or excluding other embodiments, so the present disclosure may be used in various other combinations, modifications, and environments, and is capable of being altered by the above teachings, technology or knowledge of related fields based on the scope of the present disclosure. Therefore, a person skilled in the art may make various modifications to the present disclosure. Those modifications still fall within the spirit and scope defined by the appended claims.

What is claimed is:

1. A system that generates an authentication code, comprising:
    one or more processors;
    memory to maintain a plurality of components each comprising a computer readable program module executable by the one or more processors, the plurality of components comprising:
        a context generating module configured to generate a plurality of contexts based on a rendering style configuration file, each generated context of the plurality of contexts being different from each other and corresponding to each of the plurality of components, respectively,
        a random word generating module configured to generate a word from a word library based on a word context,
        a background generating module configured to generate a background diagram based on a background context,
        wherein the system generates the authentication code at least based on the generated word and the generated background diagram, and
        a checking module configured to
            check the generated authentication code based on a predefined checking rule comprising at least one prohibited combination of a first context used in a first component of the plurality of components to generate the authentication code, and a second context used in a second component of the plurality of components to generate the authentication code, and
            restart a configuration of a context for a corresponding component of the plurality of components based on the predefined checking rule to generate an additional authentication code; and
        an output interface that outputs the generated additional authentication code based on checking the generated authentication code against the predefined checking rule.

2. The system of claim 1, wherein the plurality of components further comprise:
    a font registering module configured to define a font of the word based on a font context;
    a letter paint module configured to generate a drawing of the word based on the font, the word including the drawing of the word.

3. The system of claim 2, wherein the drawing of the word includes a rigidity change and a non-linear change of the word.

4. The system of claim 1, wherein the plurality of components further comprise a logo paint module configured to:
    choose a logo based on the rendering style configuration file; and
    generate the logo based on a logo context, the authentication code further including the logo.

5. The system of claim 1, wherein the plurality of components further comprise a noise paint module configured to:
    choose a noise based on the rendering style configuration file; and
    generate the noise based on a noise context, the authentication code further including the noise.

6. The system of claim 1, wherein the background generating module is further configured to assign a size to the background diagram based on the rendering style configuration file.

7. The system of claim 1, wherein the word library comprises at least one of an English alphabet, an Arabic number, or a symbol.

8. The system of claim 1, wherein the rendering style configuration file is formed by configuring rendering style information that is one of individually configured by a user through a user interface or is pre-configured.

9. The system of claim 8, wherein the rendering style information comprises one of a parameter, a time, a step, or a status.

10. A method that generates an authentication code, the method comprising:
   generating, by a server including one or more processors, a plurality of contexts based on a rendering style configuration, each individual context of the plurality of contexts being different from each other and corresponding to a diagram style configuration of the authentication code;
   defining an executing sequence of the plurality of contexts based on a predetermined algorithm rule;
   generating a drawing of the authentication code using the plurality of contexts based on the executing sequence;
   checking the drawing of the authentication code against a predefined checking rule defining at least one prohibited combination of at least two contexts of the plurality of contexts;
   restarting a process of configuration to generate an additional drawing of an authentication code based on the authentication code not satisfying the predefined checking rule; and
   outputting the additional drawing of the authentication code based on checking the drawing of the authentication code against the predefined checking rule.

11. The method of claim 10, wherein the rendering style configuration is one of defined by a user or is pre-determined.

12. The method of claim 10, wherein the generating the drawing of the authentication code using the plurality of contexts based on the executing sequence comprises:
   randomly generating a word from a word library based on a word context;
   generating a background diagram based on a background context;
   assigning a size of the background diagram based on the rendering style configuration;
   defining a font based on a font context; and
   drawing a drawing of the word using the defined font on the background diagram based on a paint context.

13. The method of claim 12, further comprising:
   choosing a logo based on the rendering style configuration;
   drawing the logo on the background diagram based on a logo context;
   choosing a noise based on the rendering style configuration; and
   drawing the noise on the background diagram based on a noise context.

* * * * *